June 24, 1958 W. S. RAE, JR 2,840,687
WELDING APPARATUS
Filed Feb. 19, 1954 10 Sheets-Sheet 1

*INVENTOR.*
WALTER S. RAE, JR.
BY
Browning, Simms & Hyer
ATTORNEYS

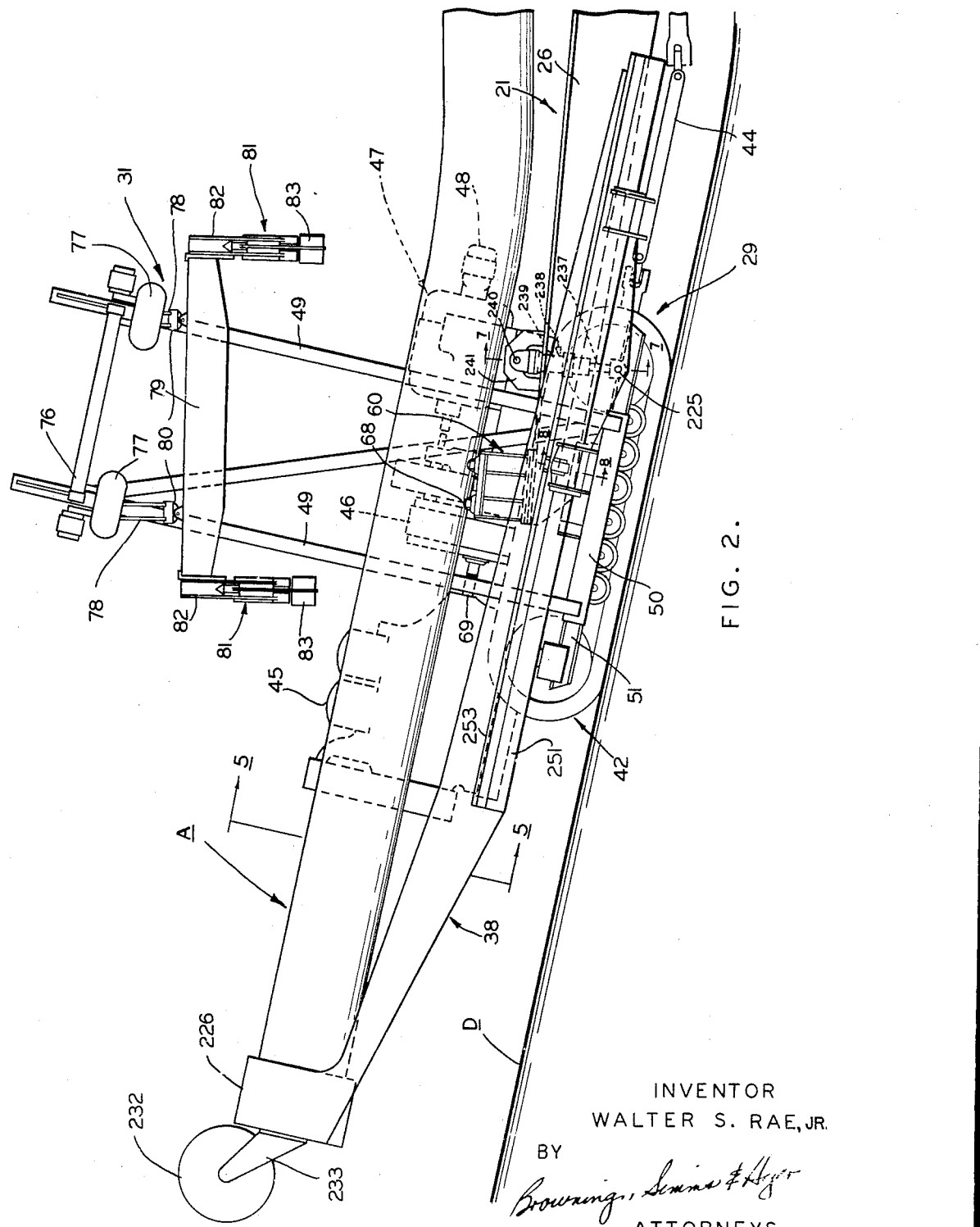

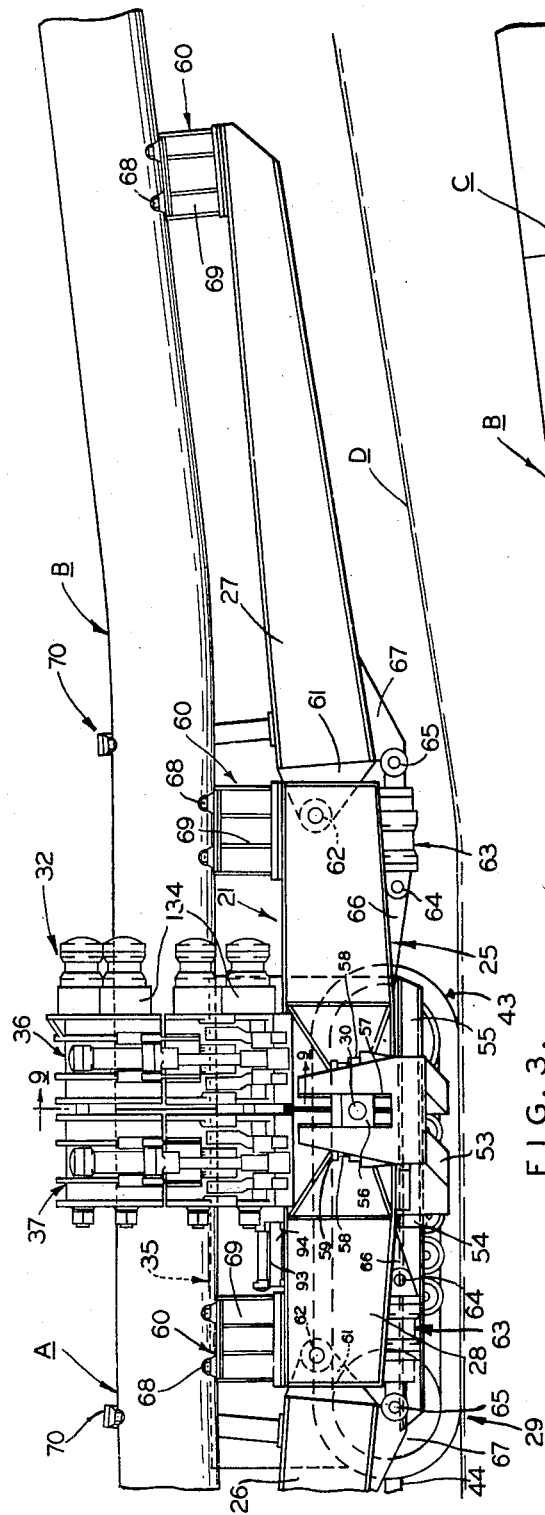

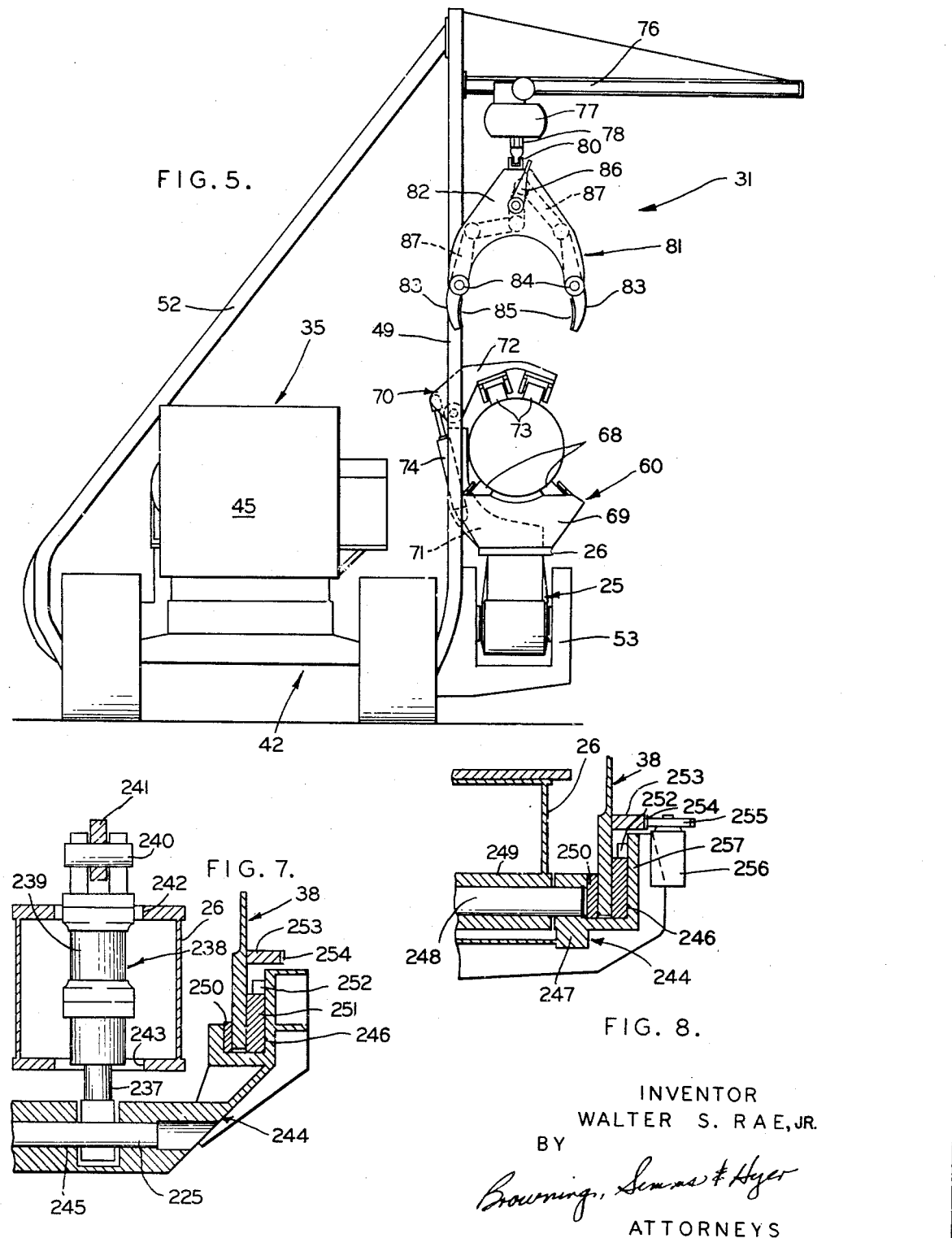

June 24, 1958     W. S. RAE, JR     2,840,687
WELDING APPARATUS

Filed Feb. 19, 1954     10 Sheets-Sheet 5

INVENTOR
WALTER S. RAE, JR.
BY
Browning, Simms & Hyer
ATTORNEYS

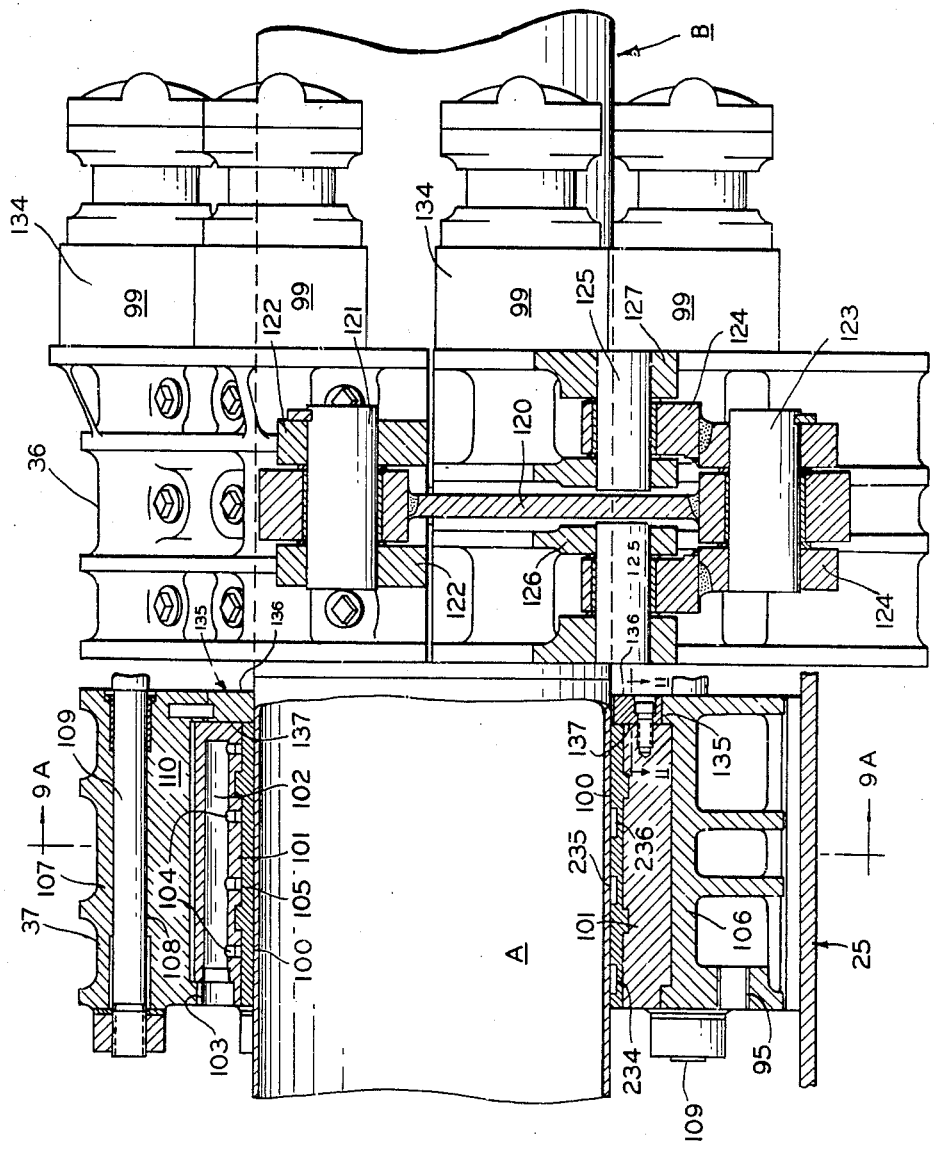

INVENTOR
WALTER S. RAE, JR.
BY
Browning, Simms & Hyer
ATTORNEYS

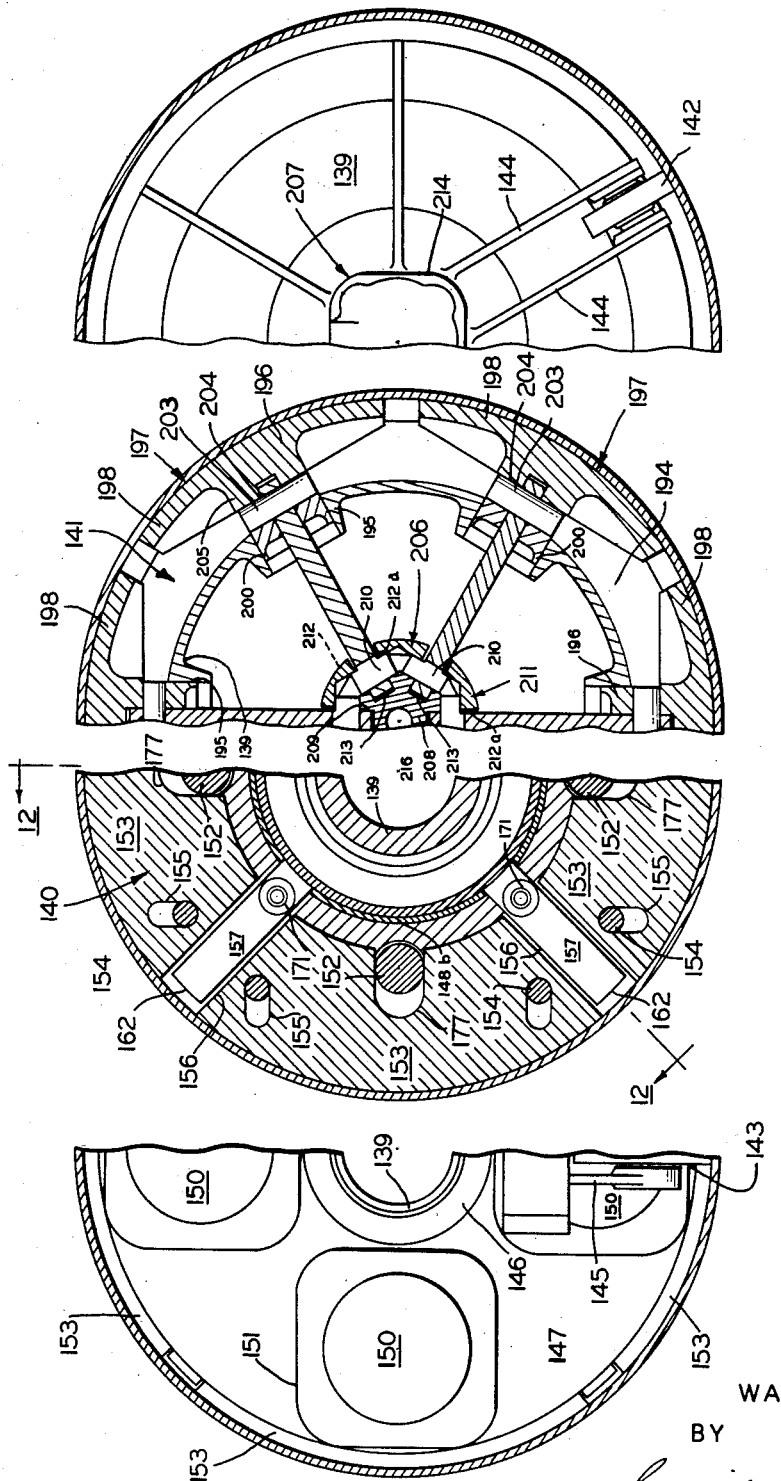

United States Patent Office 2,840,687
Patented June 24, 1958

2,840,687

WELDING APPARATUS

Walter S. Rae, Jr., Shreveport, La.

Application February 19, 1954, Serial No. 411,409

7 Claims. (Cl. 219—158)

This invention relates broadly to apparatus for welding pipe sections together in end-to-end relation. In one of its novel aspects, this invention relates to improved equipment especially well-suited for use in joining a section of pipe with a pipeline string in the field, and particularly wherein the equipment is mobile and the operation thereof substantially continuous. In another of its novel aspects, this invention relates to improved apparatus for flash welding pipe sections together.

In the past, it has been the practice in the pipeline industry, in joining a section of pipe to a pipeline, to manually or hand weld the abutting ends of the sections together. This operation has been found to be the principal bottleneck in pipeline construction. Not only has it been found to be a bottleneck from the standpoint of time, but also it is a very costly and cumbersome procedure, especially upon pipelines of a diameter up to 30 inches or more.

In the field, the pipeline string is disposed along the side of a ditch in which the line is to be laid. The end of the line to be welded to the next pipe section is elevated from the ground on skids or the like to permit the joint therebetween to be welded all around. Even with experienced welders, the manual manipulation of a welding rod on the underside of the pipe sections is a long and arduous task. It is necessary to make a series of passes of welds around the joint. Of course, it is possible to employ more than one welder so that a number of passes may be made substantially simultaneously, although it will be realized that this multiplies an already expensive cost item.

As well, the field methods presently employed in the industry are complicated by the manner in which the large sections of pipe must be held prior to and during welding. For example, the oppositely facing end edges of the pipe sections must first be smooth finished so that they may be uniformly spaced a small amount from one another. Also, the end portions of the spaced sections must be rounded with internal line-up clamps for alignment with one another. It will be understood in this respect that during the aligning process, the extreme end of the portion of the pipeline string supported on skids will tend to project upwardly in angular relation to the pipe section to be welded thereto and requires considerable force in being held in alignment with the pipe section.

Also, of course, the welded joint will be weakened if the abutting sections are stressed at the time of welding and then permanently laid in an unstressed position. This problem is further emphasized when the string of pipe sections forming the pipeline are supported during welding in a position other than the pipeline's natural curvature along the ground or in the ditch. That is, ordinarily on relatively flat terrain, when the end of the pipeline is aligned as mentioned, it will be reversely bent along its length when supported on the skids. Although the amount of bending may be slight, it is sufficient to set up stresses in the pipeline which are in a large measure transferred to the welded joint when the pipeline is lowered into the ditch.

Also, the welded joint and the portions of pipe immediately adjacent thereto are not hoop stressed as the heat of welding actually destroys the hoop stress imparted to the pipe sections during manufacture. As a result, there is another source of weakness along the pipeline.

Many attempts have been made to solve this bottleneck in pipeline construction by making the welding operation more continuous. However, the difficulties above discussed are inherent in any of the present methods and neither the time factor nor the expense has been overcome. As a result, the welding operation continues to lag and hold back the other operations involved in pipeline construction so as to remain the determining factor as far as time is concerned.

It is an object of this invention to provide apparatus for field welding pipe sections together in a new and improved manner.

It is another object to provide apparatus for successively welding pipe sections together in end-to-end relation in a more continuous manner than has been heretofore possible.

Another object is to provide apparatus especially well suited for field welding a pipe section to a pipeline string.

Another object is to provide apparatus which will support the end of a pipeline string in the field, prior to and during welding of a pipe section thereto, in a substantially unstressed condition.

Another object is to provide pipeline supporting apparatus for use in the field which is adapted to be oriented by engagement with the end of the pipeline to be supported, even if it is curved, so that the supported end of of the pipeline when at rest is substantially unstressed.

Another object is to provide apparatus for supporting the end of a pipeline string above rough terrain without setting up stresses in the end portion of the line.

Another object is to provide apparatus for supporting the end of a pipeline string and a pipe section to be welded thereto in substantial axial alignment and in unstressed condition.

Another object is to provide apparatus for use in the field which is especially well suited for supporting a curved section of pipeline so that one end thereof will be at rest in substantially unstressed condition.

Still another object is to provide mobile equipment for use in field welding a pipe section to the end of a pipeline string, whereby the section may be properly assembled with respect to the pipeline, welded thereto, and the welded joint so formed finished in a new and improved manner.

Still another object is to provide pipeline welding equipment having improved pipe supporting means for axially aligning a pipe section with a pipeline string to which it is to be welded with the opposing pipe ends substantially in round.

Still another object is to provide welding apparatus having novel clamp means for assembling and holding the ends of pipe sections in round and in proper position with respect to each other prior to and during the welding together thereof.

Still another object is to provide novel clamp means of the character described in the foregoing object which will tightly grip the pipe sections to permit controlled axial movement of one with respect to the other.

Still another object is to provide clamp means especially well suited for use in flash welding pipe sections together in end-to-end relation.

Still another object is to provide novel clamp means for use in flash welding pipe sections together in end-to-end relation, which clamp means is adapted to hold the ends of the pipe sections in position to be flash welded and subsequently remove the outer flash on the welded joint therebetween.

Still another object is to provide apparatus for use in flash welding pipe sections together and including means for establishing a predetermined hoop stress in the welded joint between the pipe sections and the immediately adjacent pipe portions.

Still another object is to provide stressing means of the character described in the foregoing object which is operatively connected to pipe supporting means of the flash welding apparatus in a manner to permit rapid insertion in and removal from within the pipeline.

Still another object is to provide means for correcting the shrinkage in a pipeline due to flash welding of a joint between sections of the pipeline.

Still another object is to provide improved apparatus for removing the inner flash from flash welded sections of pipe.

Still another object is to provide inner flash removing means which is operatively connected to pipe supporting apparatus in a manner to permit said means to be rapidly inserted in and removed from within the welded pipe sections so supported.

Still another object is to provide apparatus adapted to be disposed within a pipeline for removing the inner flash by sequentially shearing successive arcuate portions of the inner flash from the inner pipeline wall.

Still another object is to provide apparatus of the character described in the foregoing object which is automatically disposable in shearing position with respect to the inner flash upon each sequential shearing operation.

Still another object is to provide apparatus insertable within welded pipe sections for removing an inner flash formed therein, and which is movable longitudinally of said sections and over said flash into flash removing position.

Still another object is to provide apparatus for use in flash welding pipe sections together, which apparatus is disposable within and movable longitudinally of the welded sections for removing an inner flash formed at the welded joint between the sections and establishing a predetermined stress in said joint.

Other objects, advantages and features of this invention will be apparent to one skilled in the art upon a consideration of the written specification and the annexed drawings which disclose illustrative embodiments of the invention.

In the drawings, wherein like reference characters are used throughout to designate like parts:

Fig. 1 is an elevational view of one form of welding apparatus including pipe supporting means constructed in accordance with the present invention;

Figs. 2 and 3 are each elevational views of successively arranged parts of a preferred form of pipe supporting means, together with other elements of a welding apparatus for joining pipe sections together in end-to-end relation;

Fig. 4 is a view for successive arrangement with Fig. 3 and showing the trailing edge of the pipeline supported on the apparatus of Figs. 2 and 3;

Fig. 5 is an end view of the hoisting mechanism and hold-down clamps of the welding apparatus of Figs. 2 and 3, taken substantially along broken line 5—5 of Fig. 2 with the pipe supporting means disposed over substantially flat terrain and with the remainder of the apparatus shown diagrammatically;

Figs. 6A and 6B are diagrammatic views illustrating certain of the advantages obtained with the pipe supporting means of the present invention;

Figure 9:
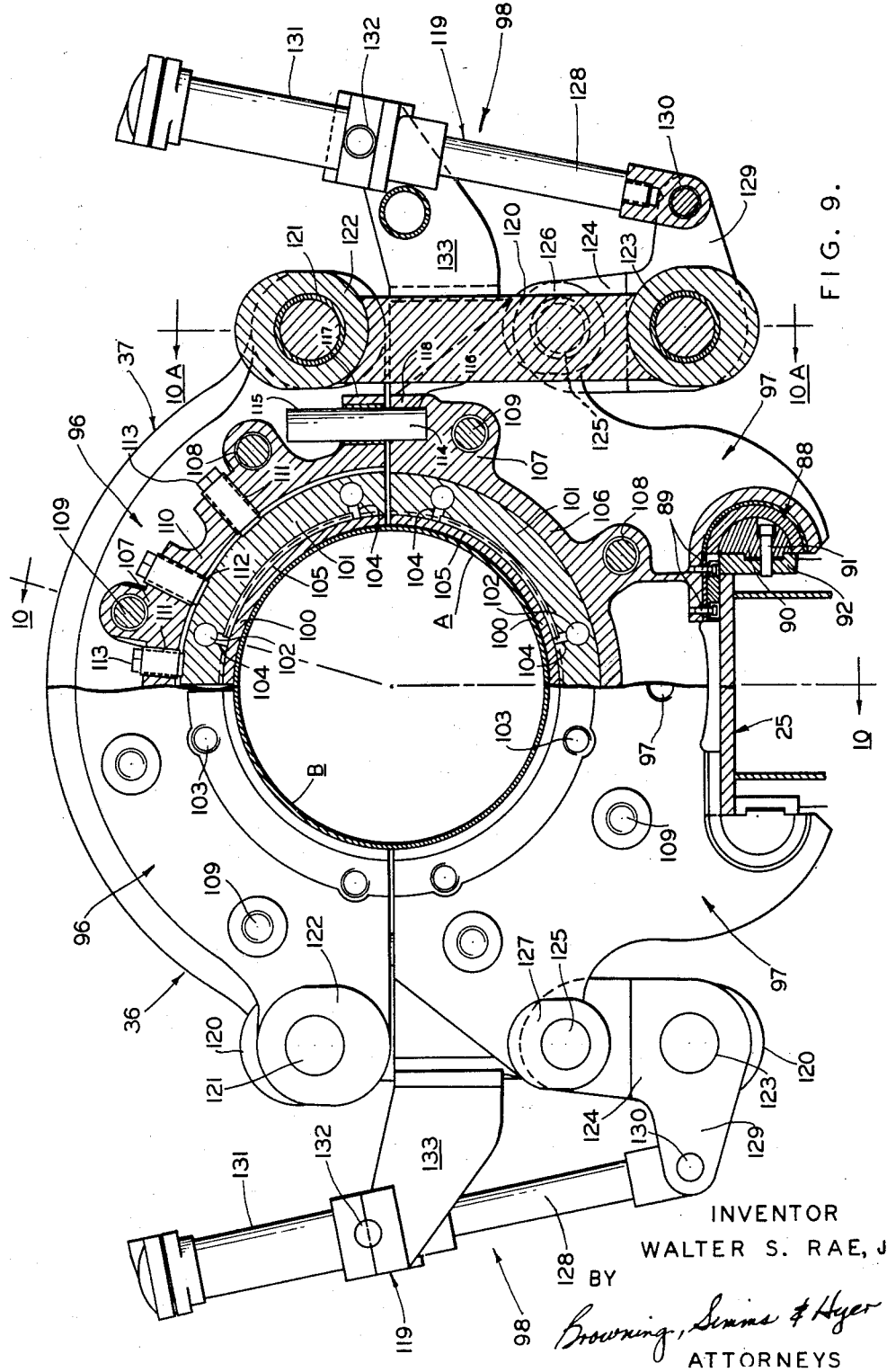
Figure 12:
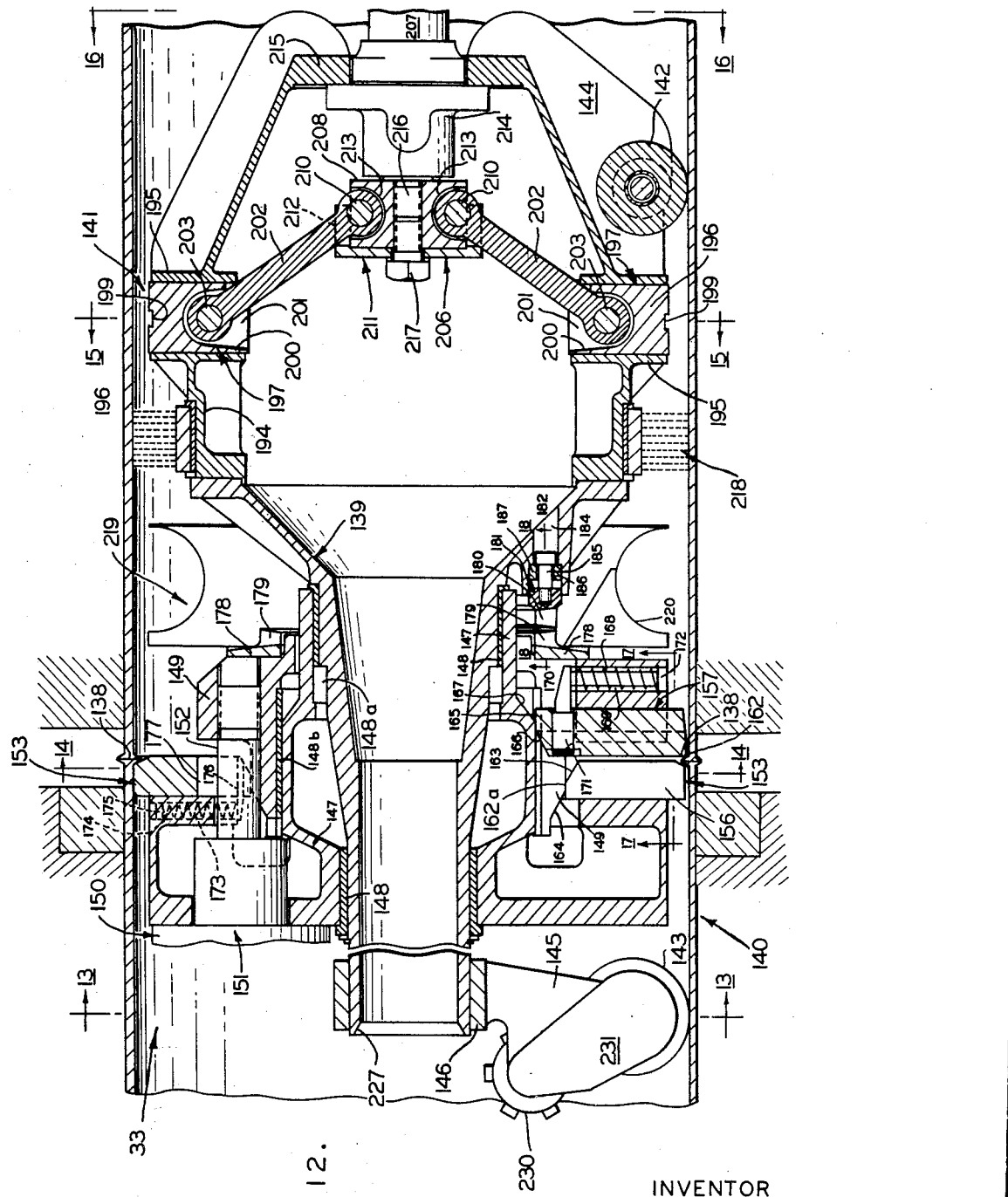
Figure 19:
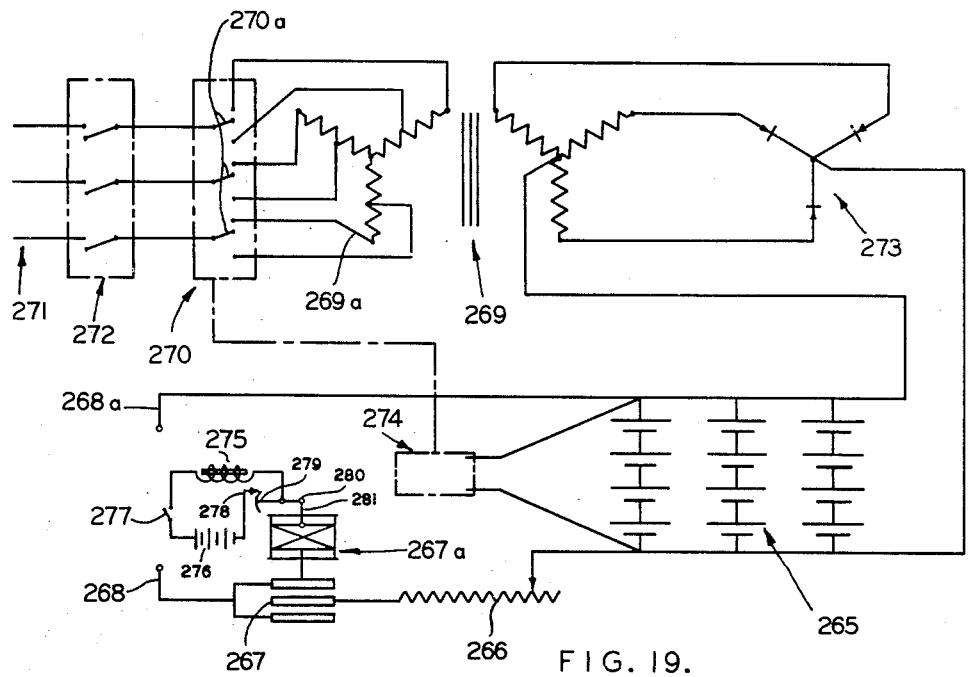
Figure 20:
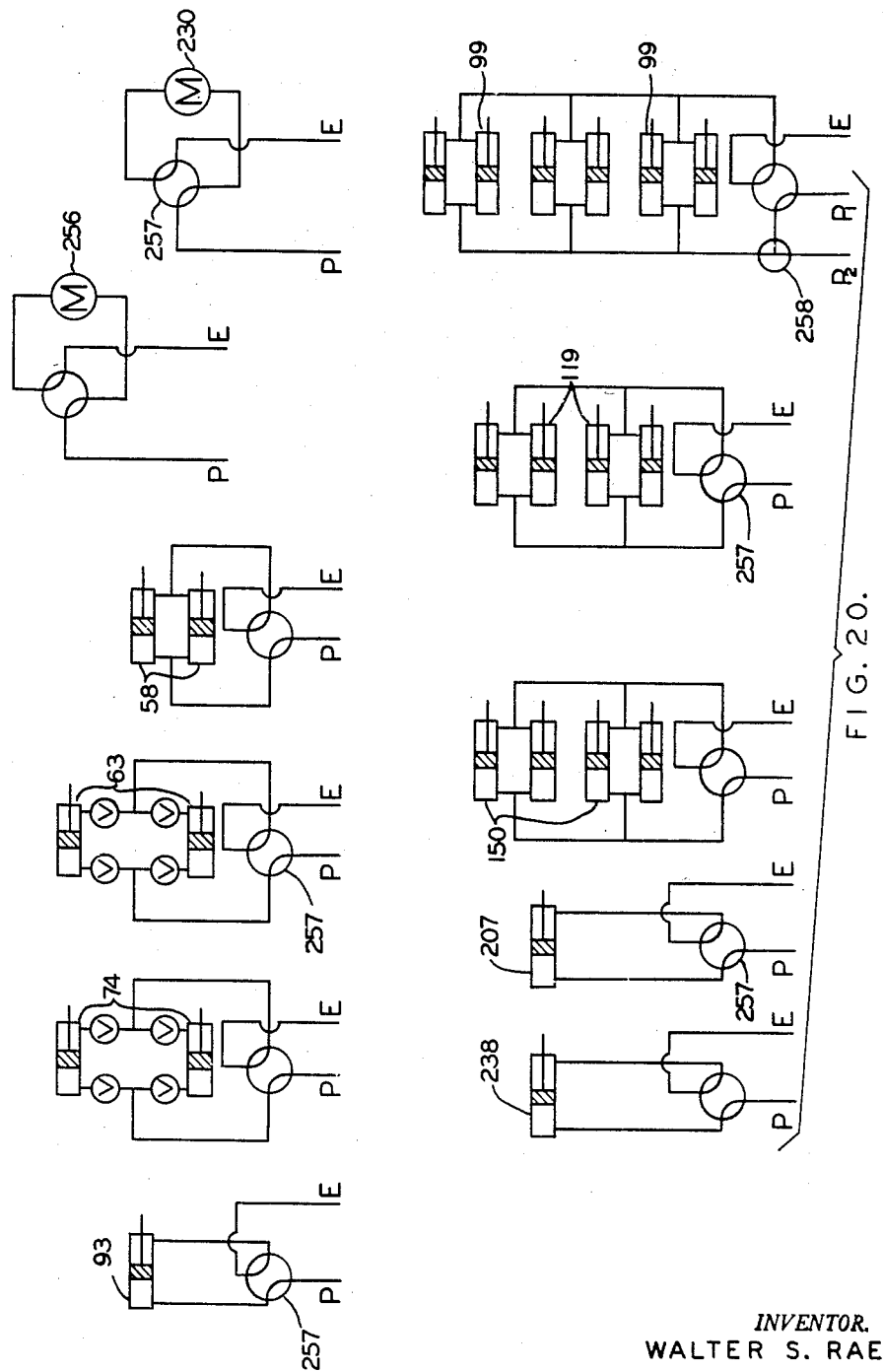

Figs. 7 and 8 are additional cross-sectional views of the preferred pipe supporting means taken, respectively, along broken lines 7—7 and 8—8 of Fig. 2;

Fig. 9 is an enlarged detailed view of the pipe clamp means shown in Fig. 3, the left side of said figure being taken substantially along broken line 9—9 of Fig. 3 and the right side thereof being taken substantially along broken line 9A—9A of Fig. 10;

Fig. 10 is an enlarged elevational view of the clamp means as shown in Fig. 3, the leftmost clamp being shown in section substantially along broken line 10—10 of Fig. 9 and the rightmost clamp being shown in section substantially along line 10A—10A of said figure;

Fig. 11 is a detailed sectional view, taken substantially along broken line 11—11 of Fig. 10, of cutting teeth on the leftmost clamp;

Fig. 12 is a longitudinal sectional view, taken substantially along broken line 12—12 of Fig. 14, showing the inner flash removing and weld joint stressing means in flash removing position within the pipe sections;

Figs. 13 to 16 are partial cross-sectional views of the means of Fig. 12, each view being taken, respectively, substantially along broken lines 13—13, 14—14, 15—15 and 16—16 of Fig. 12;

Fig. 17 is a detailed sectional view taken substantially along broken line 17—17 of Fig. 12 of inner flash cutting elements;

Fig. 18 is a detailed sectional view taken substantially along broken line 18—18 of Fig. 12 of indexing means for the cutting elements;

Fig. 19 is a wiring diagram of the electrical power system for operating the welding equipment of the present invention; and Fig. 20 is a schematic diagram of the hydraulic system for operating various hydraulic cylinders and motors of the welding apparatus.

In accordance with the present invention, there is provided welding apparatus for joining together in end-to-end relation a pipe section A and the end of a pipeline string B, which, as shown in Fig. 4, may comprise two or more pipe sections joined, for example, at C. As indicated in Figs. 1 to 4, the pipeline B is adapted to extend along the ground D, or, for that matter, in a ditch or upon skids supported on the ground, and be supported at its opposite end on pipe supporting means of the welding apparatus of the present invention, designated in its entirety by the numeral 20 in the form of Fig. 1, and 21 in the preferred form of Figs. 2 and 3. The entire length of pipe section A is supported on each form of the apparatus in end-to-end relation with respect to the supported end of the pipeline B.

The pipe supporting means of both forms of the present invention includes a beam carried above the ground D for tilting movement relative to the horizontal into position to accommodate in a state of rest the end portion of the pipeline B so as to support the end of the pipeline to be joined with pipe section A in substantially unstressed condition. The beam is preferably self-orienting in response to the forces transmitted to it by the pipe section A and end of the pipeline B supported thereon. More specifically, the apparatus 20 shown in Fig. 1 includes a rigid beam 22 swingably supported as by a pivot intermediate its length about a shaft 23 from a vehicular unit 24 adapted to ride over the ground D. On the other hand, the preferred apparatus 21 includes a beam 25 having adjustable portions for supporting curved sections of pipe. These portions include end sections 26 and 27 connected as by pivots to opposite ends of a center section 28 which is pivotally mounted from a vehicular unit 29 about a shaft 30.

It will be appreciated from the drawings that when a straight section of pipe A is to be joined with a substantially straight end of pipeline B over relatively flat terrain, the rigid beam 22 is tiltable to the position shown in Fig. 1 to receive both the pipeline and pipe section whereby only a minimum of bend is applied to the pipeline and, of course, little if any bend is applied to the pipe section. Certain of the advantages obtained by such an arrangement are illustrated by the diagrammatic views of Figs. 6A and 6B. As shown in Fig. 6A, according to present methods of pipeline construction, the end of the pipeline string B to be welded is raised from the ground D and supported upon skids E. In this position, the end of the pipeline is caused to project upwardly as shown by the broken lines. At the same time, stresses are set up in this unsupported free end of the pipeline. Still further, in the process of being aligned with the pipe section (not shown) to be welded thereto, the end of the pipeline B must be subjected to considerable force, as at F, whereby the reverse bend of the pipeline is further emphasized. On the other hand, as shown in Fig. 6B, the beam 22 is tilted into a position to accommodate the natural curvature of the end of the pipeline B supported thereon, whereby the pipeline is received in a state of rest in substantially unstressed condition.

The pipe section A and pipeline B can be similarly supported on the beam 25 of Figs. 2 and 3 with the beam sections thereof aligned with one another. Also, a flat rigid beam of the type shown in Fig. 1 is quite useful in supporting a pipeline string with a mild bend over terrain having a corresponding slope. For example, if the pipeline B, as shown in Fig. 1, had been laid upon a slight upward incline to the horizontal, and was provided with a mild bend to conform to the horizontal terrain, the beam 25 need only be tilted a small amount in a clockwise direction.

On the other hand, it will also be appreciated that the advantages of the rigid beam 22 may not be fully derived either in use over terrain having relatively sharp inclines or over summits having reversely inclined portions. In the latter case, although the rigid beam might well be adapted to support one or the other of the pipeline B and pipe section A in its naturally bent state without setting up substantial bending stresses therein, it would be difficult to so support both.

This points up the added novelty of the preferred form of welding apparatus 21 of Figs. 2 and 3. It will be understood that the pivoted beam sections 26 to 28 may be manipulated, in a manner to be described, into a variety of angular relations so as to support the pipeline and pipe section in substantially unstressed condition over most any sort of terrain. As shown by way of example in Figs. 2 to 4, the pipeline and pipe section are bent concavely to be laid upon a depression in the terrain. It will also be understood that the pivoted beam 25 is especially well adapted for supporting a pipeline on a level different from that of the terrain, in which case the pipe may be of substantially different contour than the ground level D.

The welding apparaus of both forms of this invention also includes a hoisting mechanism 31 for lifting the pipe section A onto the pipe supporting means; clamp means 32 on the pipe supporting beams for holding the ends of the pipe section and pipeline in abutting and substantially axially aligned relation prior to and during the welding together of said abutting ends; inner flash removing and weld joint hoop stressing means 33 (shown diagrammatically by dotted lines in Fig. 1 and in its preferred form in Fig. 12) insertable within and removable from the welded pipeline; and suitable electrical power and hydraulic control means, designated in its entirety by the numerals 34 and 35, supported, respectively, on the vehicular units 24 and 29 for operating the welding equipment and hydraulic devices of the apparatus of this invention.

Viewing briefly for purposes of orientation the overall operation of both welding machines, the vehicular unit is moved to the situs of the forward end of a pipeline string at any stage of pipeline construction wherein pipe sections such as section A are upon location to be laid. The pipe supporting beam carried from the vehicular unit is then tilted to a position to at least approximately accommodate the natural curvature of the end of the pipeline and is moved thereunder to a position wherein the end of the pipeline to which a pipe section is to be welded is approximately adjacent the clamp means 32, whereby the end of the pipeline will force the beam to a rest position for supporting the pipeline in a substantially unstressed condition.

At this time, the clamp means has been opened up and the individual clamps 36 and 37 thereof moved apart axially of one another to permit the pipeline to be loosely carried in the rightmost clamp 36 and the extreme end thereof extended to a position spaced from the leftmost clamp 37 and between clamps 36 and 37. As will be more fully understood from the description to follow, hold-down clamps in addition to the clamp means 32 may then be moved into position to firmly position the pipeline B on the pipe supporting beam. The hoisting mechanism 31 may then be operated to lift the pipe section A into place on the beam. More specifically, this hoisting mechanism is operated to deposit the pipe section onto the beam in spaced but substantially axially aligned relation with respect to the pipeline B, whereby the pipe section may be moved axially through the open clamp 37 to dispose the end thereof between clamps 36 and 37, similarly to the end of the pipeline, at which time the clamp means may be closed to firmly position both pipe sections on the beam.

The aforementioned hold-down clamp is then released from the pipeline and the closed clamps surrounding the opposed ends of the pipeline and pipe section are moved together to bring said ends into substantial abutment with one another, as best shown in Fig. 3. Normally these ends are out-of-round to a certain extent such that the edges thereof will not be aligned with one another, even through the clamps 36 and 37 are so aligned. To bring the edges into alignment, however, pressure is applied to the clamps to radially compress and round out each pipe end.

When so aligned, the opposite pipe ends may be flash welded together according to conventional methods. For this purpose, the clamps 36 and 37 are employed as electrodes for passing welding current therebetween and across the joint between the pipeline and pipe section. The edges to be welded together are first brought into pressurized engagement with the current flowing whereby a flashing action is created at the joint. When the metal is thus rendered molten, the edges are bumped together with greatly increased pressure whereby the welded joint is formed and raised flashes or protuberances are formed at the joint both inside and outside of the pipe.

Although this general technique is old, heretofore it has not been available for field operation, especially on large diameter pipe. According to the present invention, the tiltable pipe support and clamp means 32 of the present invention provide improved means for carrying it out, especially adaptable for field usage. More particularly, the clamps 36 and 37 are not only readily and controllably movable axially of one another, but also are constructed so as to hold the ends of the pipeline and pipe section in such a manner that the extreme pressures necessary in the flash welding of large diameter pipe may be applied to the end edges of the pipe to be welded. It should be noted also that when current is first flashed across the joint between the pipe ends, rough edges on the metal are burned off, permitting the ends to be pressured into more intimate relation with one another.

According to another novel concept of this invention, the clamp means 32 is operable for removing the outer flash on the welded joint. This outwardly projecting rib or bead, if permitted to remain, would interfere with subsequent cleaning and coating operations upon the outer wall of the pipeline. For this purpose, one of the clamps is provided with cutting teeth around its inner pipe-gripping periphery, whereby pressure on the clamp means may be reduced to permit the clamp and teeth carried thereby to be moved axially toward the other clamp to shear off the outer flash on the welded joint.

The flash formed on the surface of the welded joint within the pipeline would, unless removed, not only restrict fluid passage through the pipeline and thereby reduce its capacity, but also would interfere with free passage of conventional pipeline "pigs" for cleaning the inner wall by scraping deposits therefrom. It will also be understood that during any welding operation, there is shrinkage of the pipe adjacent to the weld. This is especially true in flash welding wherein the weld is formed of the parent metal itself. As a consequence, in flash welding operations, it is desirable not only to compensate for this shrinkage of the pipeline at the weld but also to pressurize the welded joint in order to reestablish therein a hoop stress comparable to that in the remainder of the pipeline. That is, during their manufacture, pipe sections are provided with a built-in hoop stress which, it will be understood, is impaired during welding of the end edges of the pipe. As a result, unless a stress is reapplied thereto, the pipeline at the welded joint becomes a point of relative weakness.

According to the present invention, the inner flash may be removed and the welded joint stressed in a most expeditious manner by the use of the aforementioned means 33 which is insertable within the pipeline by an arm 38 carried from the beam on the pipe supporting apparatus. Although the insertion of the means 33 within the pipe is described chronologically herein as following the welding operation, it will be appreciated that it may actually precede or be performed substantially simultaneously therewith. This is especially true if, as will be described, it is desired to shield the inside of the pipeline during the flash welding operation.

As shown in Fig. 2 and as will be more fully explained hereinafter, this arm is carried from the pivoted beam of the preferred form 21 of this invention in a manner to permit the means 33 to be inserted within the pipeline regardless of its angular disposition on the beam. When so disposed within the pipeline, the means 33 is adapted to be moved longitudinally thereof toward the joint between pipeline string B and pipe section A. Such movement may be provided by suitable driving mechanism operable from the arm 38, as is the case in the form of Fig. 1, or by self-motivating mechanism on the means 33 itself, as is the case in the preferred form of welding apparatus of Figs. 2 and 3, and as shown in Fig. 12.

In either case, however, the means 33 is controllably movable longitudinally within the pipeline so as to be selectively disposable in an inner flash removing position. In this position, annular cutting elements on the body of the means 33 are disposed adjacent one side of the inner flash and caused to be moved longitudinally of the pipeline to remove the same. The cutting elements and guides therefor are mounted from the body in a manner to permit them to be moved over and positioned with respect to the inner flash while at the same time being returnable to outwardly extending shearing position.

More particularly, a plurality of such cutting elements are arranged in spaced relation to one another such that each simultaneously removes an arcuate portion of the flash, as otherwise tremendous force would be necessary to remove the entire flash at one time. However, in order to remove the entire flash in successive shearing or cutting operations, the cutting elements are indexed rotatably of the body of the means 33 after each cutting operation thereof so as to be disposed in position to remove additional arcuate portions of the flash. According to still another novel aspect of this invention, this indexing means is automatically operable upon longitudinal cutting movement of the cutting elements.

Upon removal of the entire inner flash by successive cutting operations, the means 33 is moved into weld joint hoop stressing position. Although the stressing mechanism is, in its preferred embodiment, part of the means 33 and carried by the body thereof, it will be understood that it may be separate therefrom. This hoop stressing mechanism comprises a series of shoes arranged circumferentially on the body of the means 33 and movable radially outwardly therefrom into engagement with the inner surface of the weld joint to apply a predetermined stress thereto.

Upon completion of the foregoing operations, the means 33 may be removed from the pipeline by the arm 38 similarly to the manner in which it was inserted therein. Then, upon further removal of this means away from the free end of the pipeline, the clamp means 32 may be opened to permit the vehicular unit to be advanced such that the clamps carried on the pipe supporting means will be caused to slide under the newly added section of pipeline. This advance is continued until the rightmost clamp 36 is disposed slightly to the right of the extreme end of this section, which now constitutes the forward end of the pipeline.

At this time, the beam is caused to orient itself in accommodating the natural curvature of the pipeline, after which the aforementioned hold-down clamp is again tightened upon the end of the pipeline. The welding operation may now be continued according to the foregoing description wherein another section of pipe is welded to the end of the pipeline. It will thus be understood that the overall apparatus of the present invention permits a substantially continuous welding operation. It will be noted also that once set in operation the equipment of this invention does not require that a just welded section of pipe be lowered onto the ground or other support and subsequently raised preparatory to welding. To the contrary, the pipeline is at all times carried by the apparatus such that pipe sections may be welded thereto in a much quicker and more efficient manner than heretofore known in the art. As well, the pipeline so constructed is much stronger than those built according to prior methods.

In the above general description, various elements of the form 20 of this invention shown in Fig. 1 have been assigned the same reference characters as like or substantially similar elements of the preferred form 21 of Figs. 2 and 3. A similar procedure will be followed in the detailed description to follow, although, inasmuch as it is not the preferred form, the form of Fig. 1 will not be described with the same detail as the preferred form.

*Vehicular units*

As shown in Fig. 1, the vehicular unit 24 includes a flat deck 39 adapted to be moved along the ground D on wheels 40 and supporting the electrical power and hydraulic control system 34 for operating the flash welding equipment and the various hydraulic cylinders and motors, to be described hereinafter, as well as the hoisting mechanism 31. The shaft 23 for the beam 22 is journaled in a support 41 extending laterally of the vehicular unit 24, such that the beam is tiltable with respect to the unit in a vertical plane spaced to the side thereof. Also, the support 41 is elevated above the ground level to provide a relatively large tilting arc for the beam.

The vehicular unit 29 of the preferred welding apparatus of Figs. 2 and 3 comprises a pair of caterpillars 42 and 43 joined together by universal linkage 44 permitting each to ride flat over different inclines, as shown. The forward cat may be driven by a G. M. twin six diesel engine 45 and carry a flywheel 46, G. E. 300 kva., 440 volt, 60 cycle, 3-phase generator 47, and a G. E. 3 kva. exciter 48. The rear cat 43 carries the electrical power and hydraulic control system 35 which includes a storage power unit transformer, a rectifier and storage batteries, which will be discussed in connection with the wiring diagram of Fig. 19. Also carried on the rear cat, but not shown, is a water cooler and the hydraulic control system, the operation of which will be described in connection with the schematic view of Fig. 20.

As shown in Fig. 2, the front uprights 49 for the hoisting mechanism 31 are mounted on a bracket 50 adjustably positioned on slide 51 carried by one side of the forward cat 42. Angularly disposed braces 52 for the uprights 49 are similarly supported from the opposite side of the cat, as indicated in Fig. 5.

A support 53 is carried upon a bracket 54 adjustably movable over a slide 55 mounted on the rear cat 43, as shown in Fig. 3, for carrying the shaft 30 of beam section 28. The opposite ends of the shaft 30 are journaled in trunnions 56 which are received in cradle portions 57 of the support 53 for guided vertical reciprocation therein. Double-acting hydraulic cylinders 58 are mounted vertically on the support for controllably lifting or lowering a plate 59 secured to the upper end of the trunnions. In this manner, the elevation of the entire pipe supporting means above the ground level D, as well as its longitudinal position, can be adjusted as desired.

Pipe supporting means

As previously mentioned, the beam 22 of the form of welding apparatus shown in Fig. 1 is rigid along its length and is provided with a series of dollies 60 at spaced locations along its flat pipe supporting surface. As shown in Fig. 1, these dollies are spaced two on each side of the shaft 23 so as to support the pipe section A and pipeline B along at least two spaced locations. Preferably, one dolly on each side is disposed toward the ends of the pipeline and pipe sections to be welded together, while the other dolly is substantially adjacent the outer end of the beam.

The end beam sections 26 and 27 shown in Figs. 2 and 3, illustrating the preferred form of pipe supporting apparatus, are provided with flanges 61 which extend into the center section 28 and are pivotally carried therefrom on shafts 62 extending across the center section. The pivotal movement of each of the end beam sections about the center section is controlled by a hydraulic cylinder 63 pivotally connected at opposite ends about pins 64 and 65, to brackets 66 and 67 on the center section and end section, respectively. Similarly to the hydraulic cylinders 58, the cylinders 63 are double-acting to permit swinging of the end beam sections in either a clockwise or counter-clockwise position. However, each of the latter cylinders is individually controllable to permit movement one independent of the other.

The dollies 60 are arranged along the entire pivoted beam 25 similarly to the general manner in which they are disposed along the beam 22. However, in this case, the inner dollies are each disposed adjacent opposite ends of center section 28 and the outer dollies adjacent the outer ends of end sections 26 and 27. As best shown in Fig. 5, each dolly not only elevates the pipe above the beam but also is constructed to permit longitudinal sliding movement of the pipe relative to the beam by means of rollers 68 rotatably mounted angularly from a support 69 secured to the beam so as to guide the pipe longitudinally and at the same time tend to prevent any lateral movement thereof.

Hold-down clamps 70 may also be mounted from the beams for frictionally engaging the top of the pipe to further aid in preventing lateral movement of the pipe as well as to prevent longitudinal movement thereof. One such clamp 70 is shown in Fig. 1 on beam 22 for securing the pipeline B, while a pair is used on the pivoted beam, one mounted on each end beam section thereof. Of course, the degree to which each hold-down clamp tends to prevent longitudinal movement of the pipe will depend upon the force applied to the pipe thereby. For this purpose, as shown in Fig. 5, each clamp is provided with an angular support 71 on the beam which pivotally carries an arm 72 having angularly disposed rotatable rollers 73 for swinging movement with respect to the support. This swinging movement is controlled by a double-acting hydraulic cylinder 74 pivotally connected at opposite ends to the support 71 and arm 72.

Thus, as can be seen from Fig. 5, the cylinder 74 may be actuated in one sense to lift the rollers 73 from the pipe or otherwise relieve pressure thereon or, on the other hand, be oppositely actuated to tightly grip said pipe for preventing longitudinal movement thereof when the clamp means 32 is not being used. It should be noted in this respect that the clamps 70 are not used during pressurized engagement of the pipe sections axially of one another but only to prevent what might be termed "free" longitudinal movement thereof in sliding over the dollies 60 under their own weight. It will also be noted that each of the hold-down clamps shown on the pivoted beam is individually controlled to permit selective holding of either or both of the pipe sections A and pipeline B.

Hoisting mechanism

The hoisting mechanism 31 mounted on the vehicular unit 24 and shown diagrammatically in Fig. 1 is of conventional form for lifting pipe section A from the ground and placing it upon the pipe supporting apparatus and, for that purpose, is neither described nor illustrated in detail. It is sufficient to note that this mechanism includes suitable means for swinging clamps 75 laterally as well as vertically of the vehicular unit and may be operated by the power means 34 carried by said unit.

For that matter, a hoisting mechanism similar to that best shown in Fig. 5 for use with the preferred welding apparatus 21 of the present invention may be employed in connection with the welding apparatus 20 of Fig. 1. As shown therein (Fig. 5), a boom structure 76 is extended laterally from the uprights 49 to provide a guide over which the motor driven hoisting drums 77 may be moved laterally of the vehicular unit. Each drum controls the suspension of lines 78 therefrom to carry supporting bar 79 (Fig. 2) from pivotal connections 80. In this manner, the aligned gripping surfaces of clamps 81 secured to opposite ends of the support 79 may be moved vertically in any desired angular relationship with respect to the ground level or the pipe supporting apparatus. Thus, pipe section A may be lifted from the ground and then laid substantially simultaneously on each of the spaced dollies 60, which are out of parallel with the ground, by individual control of the hoisting drums.

Each of the clamps 81 comprises a rigid upper member 82, carried at the end of the supporting bar 79 and having an inner arcuate surface which describes approximately 180° of the circumference of the pipe to be lifted, and arms 83 pivotally connected by pins 84 to opposite ends thereof. Each arm is provided with an arcuate pipe gripping surface 85 of substantial width and shaped to fit the pipe. In pipe gripping position, the upper member 82 and arms 83 are adapted to encompass greater than 180° of the circumference of the pipe section A. Thus, when each clamp is disposed over the pipe to be lifted and the lever 86 is turned clockwise in Fig. 5 to actuate linkage 87 connecting the lever and pins 84 for the arms 83, said arms will be closed about the underside of the pipe and the weight of the pipe itself may be used to hold the clamp closed on said pipe.

Pipe clamps

The clamp means 32 shown diagrammatically in Fig. 1 may comprise a conventional type of apparatus comprising upper and lower members pivotally connected about one side for swinging movement of the upper member to an open position. However, the novel type of clamp employed in connection with the pipe welding apparatus of Figs. 2 and 3 is preferred and may be employed in connection with the welding apparatus of Fig. 1. In this preferred embodiment, each of the clamps 36 and 37 is slidably movable over the top of center beam section 25, as shown in the cross-sectional view of Fig. 9, by means of semi-cylindrical bearing members 88 detachably secured to the clamps by dowel pins 89 and adapted to fit over semi-cylindrical bars 90 detachably secured by dowel pins 91 to guide members 92 welded or otherwise secured to opposite sides of the beam section 25. Thus, upon longitudinal movement of the bearing members 88 relative to the beam section, the pins 91 may be uncovered to permit their removal and sliding of bars 90 out of guides 92. Such an arrangement permits rapid installation and replacement of the clamps 36 and 37 as well as the bearing members 88 thereof.

The clamps 36 and 37 are adapted to be moved as a unit longitudinally of the beam section by means of a double-acting hydraulic cylinder 93 carried horizontally upon a support 94 on the top of the beam section (see Fig. 3). This cylinder is not shown in Figs. 9 and 10, but is arranged with respect to the clamp 37 such that its outwardly extended piston rod is received through an opening 95 therethrough, which opening is shown in Fig. 10. As will be understood from the description to follow of the connection between the individual clamps 36 and 37, with this rod secured against longitudinal movement in the opening, actuation of the cylinder 93 will move the clamps as a unit in the desired direction over the beam section.

Each clamp comprises upper and lower semi-cylindrical dies 96 and 97, respectively, which are adapted in the closed position shown in Fig. 9 wherein the dies are in slightly spaced relation, to tightly engage the pipe. The lower die 97 is secured against vertical movement with respect to the beam by its attachment thereto through the bearings 88, while the upper member is adapted to be guidably moved vertically thereof by lifting means 98 so as to open the clamps for the reasons afore-mentioned. As well, the clamps are movable axially relative to one another by means of a series of hydraulic cylinders 99 arranged longitudinally of the axis of the clamp means and operable, in a manner to be described, to move the abutting ends of the pipe section A and pipeline B into pressurized engagement with one another.

Each of the upper and lower dies 96 and 97 includes a bearing surface 100 defining an arcuate surface to fit the pipe and an intermediate plate 101, the latter being longitudinally recessed internally at a number of points circumferentially thereof to provide chambers 102 for containing coolant for the bearing surface 100. More particularly, each chamber 102 is provided with an inlet 103 communicating with the outside of the clamp whereby coolant may be supplied thereto through suitable hose connections from the afore-mentioned coolant supply carried by the vehicular unit 29. Adjacent chambers on each die are connected by openings 104 with circumferentially arranged fluid passageways 105 extending around and adjacent to the bearing surface 100.

An outer plate 106 closely engages the outer surface of the intermediate plate 101 of each of the lower dies 97 and is provided with a series of raised portions 107 at spaced points around its periphery having openings 108 therethrough for receiving the piston rod 109 of each of the hydraulic cylinders 99 on the lower dies. More particularly, each lower die of the clamps is provided with equally spaced and aligned journal openings for the piston rods of the cylinders whereby a substantially uniform pressure can be applied around the lower half of the joint between pipe section A and pipeline B. Also, of course, the extension of the piston rods through the lower dies of the spaced clamps 36 and 37 serves to keep them longitudinally aligned during operation and thereby insures axial alignment of the openings through the clamps.

An outer plate 110 for the upper dies 96 is disposed in slightly spaced relation to its respective intermediate plate 101, but is otherwise similar to the outer plate 106 in that it is provided with raised portions 107 having openings 108 for the piston rods 109 of the hydraulic cylinders 99 for clamp 36. Thus, it will be understood that upon vertical movement of the upper dies 96 of each clamp in unison, the rods 109 likewise serve to insure the longitudinal alignment of the pipe gripping surfaces of the upper dies.

In addition, however, the outer plates 110 of the upper dies are provided with a series of spaced and radially extending openings 111 which receive shoes 112 for bearing relation on the periphery of the intermediate plate 101 thereof, as shown in Fig. 9. By means of an adjusting stud 113, each shoe may be urged radially inwardly for applying pressure upon the pipe section received in the clamp.

As previously mentioned, the upper die of each clamp is movable vertically of the lower by the lifting means 98. This vertical movement is guided by a vertically extending pin 114 received at opposite ends in guide passages 115 and 116 in flanged portions 117 and 118 of the upper and lower dies, respectively. More particularly, the flange portions are arranged in opposed relation to one another at oppositely facing edges of the outer plates of each of the die members. It will be understood from the foregoing and in connection with Fig. 9, that the pin 114 will limit vertical movement of the upper die relative to the lower die in a direction perpendicularly to the abutting surfaces therebetween such that upon either opening or closing of the clamps, the upper die will be either lifted off or lowered onto the pipe section without binding therewith.

Referring now to the lifting means 98, each clamp is provided with a pair of hydraulic cylinders 119, one at each side thereof and operably linking the upper and lower dies 96 and 97 for controllably moving the latter vertically of the former. With reference to Figs. 9 and 10, a link 120 is pivotally carried at its upper end upon a shaft 121 supported between flanged bearing portions 122 of the upper die 96 and at its lower end upon a shaft 123 pivotally supported from the lower ends of spaced apart links 124. The upper ends of the links 124 are pivotally carried from shafts 125 journaled in flanged bearing portions 126 and 127 of the lower die 97, whereby, in the position shown in the figures, the link 120 is received between the shafts 125 and flanged portions 126. From the foregoing and with reference to the right side of Fig. 9, it can be seen that as the links 124 are swung counter-clockwise, the shaft 123 will be moved in like manner to elevate the shaft 121 and thus raise the upper die away from the lower die. Of course, this elevating movement will be guided in a vertical direction by means of the pin 114.

This swinging movement of the links is induced by simultaneous actuation of the cylinders 119 at opposite sides of the clamps. That is, the free end of the piston rods 128 of each cylinder is pivotally connected to the projections 129 on the spaced links 124 by means of a shaft 130 extending therebetween, while the casing 131 of each cylinder is pivotally supported about pins 132 carried from a bifurcated bracket 133 extending outwardly from the lower die 97. Thus, upon retraction of the piston rod 128, the links 120 and 124 (as shown on the right side of Fig. 9) will be swung counter-clockwise to raise the upper die 96 and thus open the clamps. Of course, each of the hydraulic cylinders 98 is actuated in unison to prevent binding of the upper dies of each clamp upon the pin 114 as well as binding of the upper dies of both clamps upon piston rods 109 of the upper cylinders 99.

As best shown in Figs. 3 and 10, each of the casings 134 of the cylinders 99 is secured to the side of the clamp 36 and arranged horizontally for extension of the piston rod 109 of each through aligned openings 108 through both clamps 36 and 37. These rods 109 are keyed to their respective openings 108 in the clamp 37 such that, upon actuation of the cylinders 99, said clamp may be moved axially of the clamp 36 to a limited extent. This relative axial movement of the clamps permits ends of the pipe section A and pipeline B to be moved into abutting relation with one another upon retraction of the piston rods. As well, of course, extension of the rods from the casings 134 will permit a desired separation of the clamps for a purpose previously described.

Also, the cylinders are adapted to be actuated in unison not only to permit axial movement of the clamps without binding on the rods 109, but as well to aid in applying a uniform pressure across the joint between the abutting edges of pipe section A and pipeline B during the welding operation. For this purpose, the cylinders and rods are preferably arranged in substantially equally spaced relation circumferentially of the clamps, as shown in Fig. 9. A pressure of desired amount may be alternately applied to and relieved from the joint by means of the double-acting hydraulic cylinders 99 which, as shown, are of relatively large size.

As was previously mentioned in connection with the general description of this invention, the clamps 36 and 37 may be employed as electrodes such that welding current from the electrical power source 35 may be passed between the spaced clamps and across the joint in flash welding the pipe sections together. Suitable leads from the power source to the clamps for transmission of the current are not shown but may be connected thereto in a conventional manner.

In operation then, the ends of the pipe section A and pipeline B are first carried loosely within the open clamps 37 and 36, respectively, and the cylinders 119 actuated to close the clamps and tightly grip said ends against longitudinal as well as rotational movement with respect thereto. The cylinders 99 may then be actuated to move the clamps axially toward one another and thus bring the ends of the pipe sections into abutting relation, as shown in Figs. 3 and 10. It will be noted that the pipe sections are carried by the clamps with a small portion of their ends projecting outwardly from the opposite side faces of the clamps such that the clamps are slightly spaced apart. This spacing of the clamps not only permits the welding current to be passed therebetween but also permits further movement of the clamps toward one another during the actual flash welding operation and actual formation of the outer flash itself.

Either prior or subsequent to this movement of the ends of the pipe sections into abutting end-to-end relation, additional radial pressure may be applied to the clamps by means of the cylinders 119 for rounding out the sections to conform to the cylindrical curvature of the clamp gripping surfaces. That is, as mentioned previously, the ends of the pipe sections, as received in the field, are almost invariably out-of-round, sometimes to an extent to cause gaps between their ends when moved into abutment with one another. Regardless of the degree of this misalignment, however, a better weld is secured across the joint when the abutting ends are both rounded out and thus substantially axially aligned. It will be found, of course, that the mere gripping of the clamps for moving the pipe sections axially of one another does not normally require a pressure of the magnitude necessary for rounding out purposes. In this respect, it should be noted that the shoes 112 within the clamps permit adjustment of the pressure applied to the pipe sections by the clamps. This is particularly useful upon wearing of the bearing surface 100 or imperfect operation of the cylinders 98 in closing the clamps.

With the ends of the pipe sections in abutting and axially aligned relation, the flash welding operation may be started. An initial pressure of relatively small magnitude is first applied to the joint while current is passed thereacross for a determinable period of time, at the completion of which a considerably greater "bumping pressure" is applied to the now molten metal of the joint whereby a flash is formed at each side thereof. This "bumping pressure" is brief and is terminated upon stoppage of welding current across the joints.

As previously mentioned, novelty is not alleged in the flash welding method apart from the improved apparatus of the present invention. However, by way of example, it is contemplated that when pipe sections of 30 inch diameter are being welded, an initial pressure of 250–900 p. s. i. will be applied across the joint therebetween during approximately 26 seconds of six volts of electricity. At this time, the parent metal of the pipe sections is not only rendered molten to form a welt but also the abutting edges of the pipe sections are eroded to facilitate a tight joint therebetween. Thus, even pipe edges which are slightly angled with respect to each other may be flashed down so as to form a tight joint. After this initial period, the pressure upon the joint may be further increased by means of the cylinders 99 so as to "bump" the molten edges together at about 2500–9000 p. s. i. for about four seconds with 4.4 volts of electricity. In this manner, a flash is formed at both the inner and outer periphery of the joint, as shown in Fig. 12.

It will be understood from the foregoing that not only must the cylinders 99 be capable of applying great pressure through the clamps to the abutting pipe ends but also the cylinders 119 must be capable of exerting radial pressure on the pipe sections of sufficient magnitude to prevent longitudinal movement within the clamps during pressurized abutment of their ends. Of course, the novel clamps are especially well adapted for high radial compression due to the above-described linkage connecting the upper and lower dies of the clamps and the cylinders 119 which provides for additional mechanical advantage.

Arranged around the inner periphery on the side of the clamp 37 facing the opposite clamp 36 is a ring-shaped cutting element 135 having cutting teeth 136, serrated in the manner shown in detail in Fig. 11, entirely around the outer edge thereof. The element 135 is received in a recess 137 of the clamp 37 and is suitably secured for preventing movement with respect thereto. Thus, the cutting edges of the teeth 136 are closely adjacent the pipe section A such that the radial compression of the clamps may be lessened by means of the cylinders 119 to an extent sufficient to permit the cylinders 99 to be actuated to move clamp 37 axially toward the clamp 36 and thereby cause the entire outer flash (not shown in Fig. 10) to be removed by said cutting edges. This, of course, is another factor in determining the desired spacing between the clamps when gripping the ends of the pipe sections. That is, this spacing should be great enough to permit the teeth 135 to traverse the outer flash to their full depth of serration. It should be noted also that the serrated teeth permit cutting of the flash with a minimum of pressure applied thereto inasmuch as only a fraction of a section of the flash is being cut at any one time.

The amount which the clamps must be released from radially compressed gripping of the pipe sections to permit relative cutting movement therebetween, while at the same time preventing longitudinal movement of the pipe sections within the clamp 36, may be controlled by the cylinders 119. For that matter, the radial compression of only the clamp 37 may be lessened by the shoes 112 to permit cutting movement thereof.

*Inner flash removing means*

The details of the inner flash removing and weld joint stressing means 33 are shown in Figs. 12 to 18, inclusive. As previously mentioned, the means 33 is adapted to be disposed within and moved longitudinally of the supported pipe sections for removing the inner flash 138 as well as for stressing the welded joint between the pipe sections. A sectional view of this overall means 33 is shown in Fig. 12 in a position within the pipe sections for removing the inner flash. While in its preferred embodiment as shown, this means includes a body 139 for carrying both a flash removing means 140 as well as weld joint hoop stressing means 141, each of the latter two devices may be separately carried.

In any case, however, the body 139 is tubular and adapted to carry the flash removing means 140 and joint stressing means 141 circumferentially thereof. Rollers 142 and 143 at the forward and rear ends, respectively, of the body serve to position the same within the pipe sections and permit longitudinal movement therealong. Rollers 142 may be supported from radially extending flanges 144 on the body and roller 143 from bracket 145 depending from a sleeve 146 surrounding said body.

The flash removing means 140 includes a sleeve-like member 147 surrounding a reduced diameter portion at the rightmost (Fig. 12) end of the body 139 and adapted to rotate therearound over bearing sleeves 148 on the outer periphery of the body. As shown in Fig. 12, these bearing sleeves are flanged at their outer ends to position the member 147 along the body. Also shown diagrammatically in Fig. 12 is an overriding clutch 148a of conventional construction which permits rotation of the member 147 about the body in only one directional sense.

Arranged in surrounding relation to the member 147 but slidable longitudinally over the reduced diameter portion thereof on sleeve bearings 148b is a ring-like cutter carrier 149. This sliding longitudinal movement of the carrier 149 is provided by a series of double-acting hydraulic cylinders 150 (shown in part only), the casings 151 of which are secured to the ends of the enlarged diameter portion of the member 147 to permit piston rods 152 thereof to be extended longitudinally through openings in said member and to be keyed at their outer ends to the cutter carrier 149, as shown in Fig. 12. Thus, upon retraction of the piston rods 152, the carrier 149 will be slidably moved longitudinally over the reduced diameter portion of member 147 and toward the enlarged diameter portion thereof, for a purpose to be described.

A series of segmental cutter guides 153 are carried from the enlarged diameter portion of member 147 for rotation therewith by means of connecting pins 154 (Fig. 14) which, however, permit each of the guides to be moved in unison longitudinally of said member. As shown in Fig. 14, the pins 154 are received in elongated slots 155 in the guides 153 to also permit each of said guides to be moved a limited distance radially with respect to the member 147 as well as the body 139. It can also be best seen from Fig. 14, that the gudies 153 are spaced from one another to define guide slots 156 for receiving the cutting or shearing edge of cutter elements 157 which are adapted to be reciprocated therein.

These cutter elements 157 are received in radially extending relation in slots 158 (Fig. 17) of the cutter carrier 149. Each of the elements 157 includes an outwardly projecting tooth 160 and flanges 161 guidably received in the slot 158 to permit sliding of the tooth radially of the carrier 149 but to prevent longitudinal movement with respect thereto. Thus, each tooth 160 is arranged opposite one of the guide slots 156 to permit reciprocation therein with a slight clearance, as best shown in Figs. 14 and 17. From the foregoing, it will be understood that with the cutter elements 157 carried by the carrier 149 for longitudinal movement therewith, actuation of the cylinders 150 in the manner above-described will induce this reciprocatory movement. As well, the lower end of each tooth is provided with a cutting edge or surface 162 (Fig. 12) facing the guide slots 156 such that with the guides 153 disposed on one side of the inner flash 138 and said edge 162 at the opposite side thereof, reciprocation of the teeth of the cutter elements within said slots will shear off the arcuate lengths or portions of flash so disposed between the guides and cutting edge.

As previously mentioned, each of the segmental cutter guides 153 and cutter elements 157 is adapted to be moved radially of the member 147 and cutter carrier 149, respectively. The purpose of this construction is to permit movement of the cutter guides and elements longitudinally within the pipe sections and over the inner flash 138 prior to the removal thereof, the necessity for which will be more fully understood from the description to follow. In other words, each of the cutter guides and elements are retractable radially inwardly from their positions shown in Fig. 12 to permit them to be moved without injury thereto over the inner flash 138.

As shown in Fig. 12, the inner end of each cutter guide 153 is provided with a horizontal surface 162a adapted to slide over the horizontally disposed periphery of the reduced portion of cutter carrier 149. This surface 162a is beveled, however, at 163 to an angle corresponding to a beveled peripheral portion 164 of said carrier to permit the cutter guide to ride down upon said portion when the piston rods 152 are extended to move the carrier to the right in Fig. 12. In like fashion, the inner end of each of the cutter elements 157 has a horizontally disposed surface 165 adapted to slide over the periphery of the reduced diameter portion of the member 147 as well as a surface 166 beveled to correspond with the beveled periphery 167 of the member 147. In this case also, the surface 166 rides down upon beveled periphery 167 upon extension of the piston rods 152 to move the carrier 149 longitudinally to the right of the member 147.

Thus, actuation of the cylinders 150 in a single directional sense will permit both the cutter guides and elements to be retracted radially of the body 139. Positive displacement of each of the cutter elements 157 into this retracted position during sliding engagement of the beveled surfaces is provided by a compression coil spring 168 received in a passageway 169 through an enlarged portion of the carrier 149 which, as previously mentioned, is also slotted, as at 158, for guiding said element. The passageway 169 is disposed behind the cutter element so as to position the coil spring for bearing relation upon a flange 170 of a pin 171 received in an opening through the element. The coil spring 168 is held in this bearing relation by a plug 172 secured in the passageway 169 so that as the beveled surface rides down upon the periphery 167, the cutter element 157 will be positively displaced to its retracted position.

As shown by broken lines in Fig. 12, each of the cutter guides 153 is similarly urged to a retracted position by a coil spring 173 received in a passageway 174 through the enlarged diameter portion of the member 147 and forced by a plug 175 into engagement with a flanged pin 176 carried by the cutter giude. One or more of such positive displacement means may be provided for each guide, although each such means must be arranged so as not to interfere with either the piston rods 152 or connecting rods 154. As shown in Figs. 12 and 14, each cutter guide is provided with an elongated, radially extending slot 177, similar to the slot 155 for each connecting rod 154, to permit said guide to be moved over its respective piston rod 152 during its retraction.

The novel indexing means for sequentially rotating the cutter elements and guides subsequent to each cutting operation, whereby successive arcuate portions of the inner flash may be removed in successive cutting operations, is shown in Figs. 12 and 18. This indexing means includes a driving ring-like member 178 secured to the rightmost (Fig. 12) end of the cutter carrier 149 and having saw teeth 179 formed around the outer side thereof, which, upon longitudinal movement of the carrier to the right, are adapted to mesh with oppositely facing saw teeth 180 on an indexing member 181 carried by a supporting portion 182 of the body 19.

Rotation of the driving member 178 is caused by travel of the teeth 179 thereof in being moved from an inoperative position spaced from the teeth 180, as shown in Figs. 12 and 18, to an operative position in meshing engagement with said latter teeth. Viewing the means 33 from the right of Fig. 12, it can be seen that rotation of the member 178, and therefore the member 147 and cutter carrier 149, about the body 139, is clockwise such that the clutch 148a is a type which prevents rotation in an opposite direction.

The amount of rotational movement is, of course, equal to the arcuate path described between adjacent teeth and consists of an intital movement due to guided movement of teeth 179 over the teeth 180 as well as additional overriding movement due to reciprocation of the indexing member 181 with respect to supporting portion 182, the latter movement serving to properly position the oppositely facing teeth subsequent to each indexing operation. Preferably, although not necessarily, this rotational movement is less than the arcuate length of inner flash removed by the cutter element 157. In this manner, with the cutter elements of equal cutting width and equally spaced from one another, adjacent portions of the flash may be removed successively in approximately one-quarter revolution of the body 139 within the pipeline.

Turning now to the details of the indexing means, the supporting portion 182 of the body 139 is provided with longitudinally extending openings 184 which receive bolts 185 extending through slots 186 in a bearing member 187, carried by said portion 182, and secured to the indexing member 181. As well, a coil spring 188 (Fig. 18) is disposed through an opening 189 in the bearing member 187 and between recesses 189a and 190 in the indexing member 181 and portion 182, respectively, for urging said indexing member to its outwardly extended position, as shown in Fig. 18, which position is defined by engagement of the heads of bolts 185 upon the edges of bearing member 187 surrounding slots 186.

The indexing member 181 is guided in a reciprocating path angularly disposed to the axis of the body 139 to provide for the afore-mentioned additional or overriding movement of the indexing means. Thus, as shown in Fig. 14, the member 181 is provided with angled end surfaces 191 which are guidably reciprocal over similarly angled surfaces 192 of a recessed portion 193 of the bearing member 187. It will be understood, therefore, that the angle of these surfaces as well as the length of travel of member 181 in recessed portion 193 will determine the amount of override.

In the inoperative position of the indexing means, as shown in Fig. 18, the teeth 179 lead the teeth 180 such that when they are moved into operative engagement with the latter-mentioned teeth, they will be guided into meshing engagement therewith and thus initially rotated a distance equal to the spacing between the teeth less the afore-mentioned lead. Continued movement of the teeth 179, while meshed with the teeth 180, will move the indexing member 181 to its depressed position as limited by the recessed portion 193 to further rotate the teeth 179.

Inasmuch as the teeth 179 are prevented from rotation in an opposite direction by the clutch 148a, when the cylinders 150 are actuated to return said teeth to the position of Fig. 18, the indexing member 181 is held in its depressed position until the teeth 179 have been separated from the teeth 180. Upon separation of the opposed teeth, however, the indexing member is urged by coil spring 188 to its extended position. In this manner, the overriding movement of the teeth 179 is retained while that of the teeth 180 is compensated for by an equal but opposite movement. Thus, it can be seen that return of the teeth 180 to their original extended position will dispose them behind the teeth 179 in position for a subsequent rotating operation.

*Weld joint hoop stressing means*

It can be seen from Fig. 12 that the weld point hoop stressing means 141 is carried from a separable substantially cylindrical and enlarged portion 194 of the body 139. This cylindrical portion is provided with a series of radially extending sleeves 195 at spaced points circumferentially thereof such that hub portions 196 of stressing shoes 197 may be guidably reciprocated thereby into and out of stressing engagement with the welded joint. It should be understood, of course, that this stressing operation is performed subsequent to removal of the inner flash, in a manner previously described, and longitudinal movement of the stressing means 141 into position with respect to the welded joint, such that the shoes 197, when extended as shown in Fig. 15, will actually engage said joint with a desired amount of pressure. Of course, during movement of the stressing means 141 into and out of operative position with respect to the welded joint, the shoes are retracted, as shown in Fig. 12, so as to be spaced from the inner walls of the pipe sections.

Each of the shoes 197 is provided with laterally extending flanges 198 at opposite sides of the hub portion 196 and is contoured on its outer surface to conform to the inside wall of the pipe section. Also, each shoe is of substantial width, as shown in Fig. 12, so as to span the welded joint with a slightly recessed portion 199 when disposed in operative position over said joint. In this manner, allowance is made for a slight projecting portion of the inner flash which is not removed during the shearing operation.

The hub portions 196 are provided with inwardly extending skirts 200 adapted to be guided in the sleeves 195 and defining recesses 201 for receiving the outer ends of links 202. More particularly, each of the links is pivotally connected to its respective shoe by a pin 203 received through openings 204 in bosses 205 on the skirts, the bosses serving to position the pivoted end of the link laterally of the sleeve 195.

The opposite end of each of the links 202 is pivotally connected to a centrally supported and longitudinally movable bearing box 206, whereby the shoes 197 may be selectively moved into and out of weld joint stressing position by actuation of a hydraulic cylinder 207 operatively connected to said bearing box. Thus, the bearing box 206 is composed of a base 208 polygonal in cross-section and having a concave recess 209 formed around its periphery for receiving the inner ends of the links 202. Pins 210 extending through the links 202 bear partially on the recesses 209 and are held thereon by a cover 211 provided with a skirt 212 adapted to surround the base 208, slots 212a for passage of the links, and inner surfaces shaped to conform to and bear upon the upper surfaces of said pins, as best shown in Fig. 15. The extreme ends of the links are guided within countersunk recesses 213 in the recesses 209. From the foregoing, it will be understood that this construction permits rapid assembly or replacement of the stressing means 141.

The casing 214 for the cylinder 207 is secured to the forward flat end 215 of the portion 194 of body 139 such that piston rod 216 thereof may be extended through and keyed to a centrally disposed opening through the base 208. A nut 217 is releasably secured to the free end of the rod 216 for holding the cover 211 in the position shown in Fig. 12 over the base 208. Thus, the shoes 197 are moved simultaneously into stressing position by extension of the piston rod 216 and retracted from this position by retraction of the rod.

Suitably carried upon the body 139 are an annular brush 218 and flash shield 219, as shown in Fig. 12. The brush may comprise stiff wire bristles or the like which are adapted to extend into relatively tight engagement with the inner wall of the pipe section such that the weld joint may be swept clean after removal of the inner flash. That is, the brush may be passed one or more times over the joint by controlled movement of the means 33 longitudinally within the pipe.

The shield 219, on the other hand, comprises a concave section 220 secured to the ring-like driving member 178, or otherwise carried from the body 139, in spaced relation to the pipe wall to permit free movement of the shield with the body longitudinally of the pipe sections. Thus, with the means 33 disposed within the pipe sections prior to the flash welding operation, the body 139 may be moved into a position whereby the shield is over the joint to be welded to protect the inner pipeline wall as well as the remainder of the mechanism from any spattering which might result during the actual welding operation. It will be understood, however, that this shield is not absolutely essential to the basic invention disclosed herein and, in fact, would be of no utility unless the means 33 is disposed within the pipe sections prior to welding, which procedure is preferred but not required.

*Control mechanism for inner flash removing and weld joint stressing means*

As previously mentioned, with the pipe section A and pipeline B held in abutting end-to-end and axially aligned relation upon the pipe supporting means, and either prior or subsequent to the actual flash welding operation, the means 33 may be inserted within the end of the pipe section and moved longitudinally thereof into the positions aforementioned. In both the form of welding apparatus shown in Fig. 1 and the preferred form of Figs. 2 and 3, this insertion of the means 33, as well as its removal subsequent to the welding operation, is accomplished by an arm 38 carried by and adapted to be moved longitudinally of the pipe supporting beam and means on the outwardly extending end of the arm for connection with the means 33. For example, as shown in Fig. 1 in connection with the rigid beam 22, the arm 38 may be supported on one side of the beam for sliding longitudinal movement in guides (not shown) carried by the beam, and a similarly extending arm 222 may be carried thereabove from a connecting portion 223 to permit the arm 222 to be extended within the pipe section A, as shown. With the means 33 carried (as shown in broken lines) on the end of the arm 222, the arm 38 may be moved by suitable means along the beam 22 to permit insertion or removal of said means from within the pipe section.

On the other hand, the corresponding arm 38 for the pivoted beam 25 of the preferred form of welding apparatus (Figs. 2 and 3) is pivotally supported from the pipe supporting means such that it may be swung into a position substantially parallel with the contour of the pipe section A while the means 33 is being inserted or removed. The end of the arm is provided with a cylindrical sleeve-like portion 226 adapted to slide over the outer end of the pipe section and having a centrally disposed boss (not shown) connected thereto for tight sliding fit into the beveled end 227 (Fig. 12) of the reduced diameter portion of the body 139 of means 33. Thus, the means 33 is removably receivable on the boss at the end of the arm such that upon longitudinal movement of the arm 38 relative to the pivoted beam, the sleeve-like portion 226 may be received over the end of the pipe section A for either inserting or removing the means 33. As will be understood from the description to follow, self-motivating mechanism on the means 33 permits it to be moved onto or off of the boss on portion 226.

In the form of welding apparatus shown in Fig. 1, the arm 222 is movable longitudinally of the arm 38 and connecting portion 223, said movement being controllable by any suitable device such as a reversible motor 228 mounted on the connecting portion and having gearing adapted to drive the arm 222 through a gear rack 229. In this manner, the means 33 carried from the end of the arm 222 may also be moved longitudinally within the pipe sections for the purposes set forth. It will be further understood that the arm 222 may be moved to its leftmost position during insertion and removal of the means 33 such that the arm 38 need not be moved but a minimum distance relative to the length of the beam 22.

In the preferred form of this invention, however, the means 33 is provided with self-motivation whereby it may be moved longitudinally of the pipe section A for both disposal in the various above-described positions with respect to the joint to be welded as well as for sliding engagement or disengagement with the boss of sleeve-like portion 226. This motivation is provided by a reversible hydraulic motor 230 carried by the bracket 145 (see Fig. 12) and gear reducing means 231 between the motor shaft and axle for the wheel 143. A flexible conduit (not shown) for conducting hydraulic fluid from the hydraulic control system carried on the vehicular unit 29 to the motor 230 can be wound around a reel 232 (Fig. 2) carried from a bracket 233 on sleeve-like portion 226.

Various means, which will be suggestive to one skilled in the art, may be employed for controlling the movement of the means 33 longitudinally within the pipe sections so as to selectively dispose it in inner flash shielding, inner flash removing, and weld joint hoop stressing positions. It is contemplated by this invention that such means may include signals observable externally of the pipe sections which will indicate when the means has reached each of the afore-mentioned positions during its longitudinal movement such that the motor 230 may be stopped and started, as desired.

These signals may comprise a series of permanent magnets positioned within the bearing surface 100 of the clamp 37 at spaced points therealong and indicated diagrammatically at 234, 235 and 236 in Fig. 10. As the wheel 143 of the means 33 is moved along the pipe section A and over each of the magnets, there will be a change in flux which may be picked up, amplified and used for actuating suitable identifying signals in a conventional manner. Thus, for example, the magnet 235 may be so positioned along the pipe gripping surface of the clamp 37 that, with said clamp holding the pipe section A with a predetermined portion of the section projecting outwardly therefrom, the wheel 143 will be moved over said magnet at the time the shield 219 is disposed in shielding position over the joint to be welded. Such movement actuates a signal, as above-described, and the hydraulic motor 230 may be stopped. A similar procedure is possible, of course, with magnet 234 which may be disposed to indicate the movement of the means 33 into weld joint hoop stressing position and the magnet 236 to indicate movement thereof into inner flash removing position.

Turning now to the details of the pivoted beam, a shaft 225 is carried on the free end of a piston rod 237 of a hydraulic cylinder 238, the casing 239 of which is pivotally mounted by a pin 240 from a bracket 241 on the beam section 26 and extends through openings 242 and 243 (Fig. 7) in said beam section. The ends of the shaft 225 carry a guide member 244 for the arm 38, whereby the shaft may be raised or lowered relative to the beam section 26 by actuation of the cylinder 238 for swinging said arm relative to said beam section, in a manner to be described.

The guide member 244 includes a lower portion having openings 245 for receiving the shaft 225 and an upwardly extending portion spaced to the side of the beam section and provided with a guideway 246 extending longitudinally thereof for receiving the arm 38 for sliding movement relative thereto. As best shown in Figs. 7 and 8, wherein, as previously mentioned, the welding apparatus is disposed over flat terrain and the beam section 26 and arm 38 are shown substantially parallel to one another, the guide member 244 is suitably braced and webbed along its length which, as shown in Fig. 2, extends approximately one-third the length of the beam section. Also, the lower portion of the member 244 is projected downwardly in a V-shape intermediate its length to accommodate the shaft 225.

Toward its forward or leftmost (Fig. 2) end, however, the guide member is decreased in depth but built up in width, as shown at 247 in Fig. 8, to provide bearings for the ends of a shaft 248 extending through sleeve bearings 249 in the lower end of the beam section 26.

Thus, the guide member 244 and arm 38 slidable longitudinally therein are swingable about the axis of the shaft 248 and are controlled in such movement by extension and retraction of the rod 237 of the hydraulic cylinder 238.

As shown in Figs. 7 and 8, the arm 38 is provided with bearing strips 250 and 251 extending longitudinally along opposite sides of the lower end thereof which provide a sliding tight fit for the arm within the guideway 246. A bar 252 is extended lengthwise of the guide member 244 toward the upper end of the guideway so as to bear against the upper end of the bearing 251 along its length to prevent the end of the arm tilting in a vertical plane relative to the guide member. Thus, in a manner described hereinafter, the arm 38 is guidably slidable longitudinally of the guide member 244 to permit movement of sleeve-like portion 226 longitudinally with respect to the end of the pipe section A for purposes previously mentioned.

This longitudinal movement of the arm 38 is provided by a gear rack 253 secured to and extending lengthwise of said arm and having gear teeth 254 adapted to mesh with those of a gear wheel 255 rotatable on the shaft of a reversible hydraulic motor 256 mounted from the side of the guide member 244. It will be noted in this respect that only a limited amount of longitudinal movement is required for operating the preferred form of welding apparatus inasmuch as the means 33, during either insertion or removal thereof, is received on the sleeve-like portion 226 of the arm 38. Thus, for example, during removal of the means 33 from within the pipe section after welding thereof to the pipeline B, the arm need only be moved to the left (as shown in Fig. 2) a distance sufficient to permit the means 33 carried by the sleeve-like portion 226 to be entirely beyond the end of the pipe section. For that matter, removal of the means 33 may be affected merely upon opening of the clamps 36 and 37 and movement forwardly of the entire equipment so as to slide the clamps and pipe supporting apparatus along the welded pipeline sections.

*Hydraulic system*

A suitable hydraulic system is shown diagrammatically in Fig. 20, it being understood that it is within the realm of one skilled in the art to implement the details of such a system. In fact, it should be understood that means other than hydraulic may be employed in operating the various mechanisms of the present invention, although a hydraulic system is preferred from an economy standpoint in developing the relatively high pressures required by several of the hydraulic cylinders.

Hydraulic fluid may be contained under pressure within a common reservoir (not shown) carried on the vehicular supports as at 34 and 35 in Figs. 1 and 2. Fluid may be supplied from the reservoir to the various hydraulic devices by means of pressure lines, designated by the letter "P," and returned to the reservoir by means of exhaust lines, designated by the letter "E." As shown in Fig. 20, each group of double-acting cylinders and each reversible motor M is provided with an individual pressure and exhaust line. Suitable pressure in each group may be developed by conventional pumping methods as well as by proper design of the cylinder pressure responsive areas. Also, each of the lines may be provided with suitable valve control for rendering the particular cylinders operative or inoperative, as desired.

Each of the reversible motor and double-acting cylinder groups is provided with a two-way valve 257 whereby hydraulic fluid may be alternately applied to or exhausted from a side of each device. As well, in the groups including cylinders 63 and 74 valves V may be provided intermediate the lines from the pressure and exhaust lines to each of the cylinders in order to permit individual control over each cylinder of the group. On the other hand, as noted in an earlier part of the specification, the cylinders of each of the remaining groups are operated simultaneously and require no such valve control.

The group composed of cylinders 99 is provided with a first pressure line $P_1$ leading to the two-way valve 257 as well as an auxiliary pressure line $P_2$ leading to a valve 258 on the line $P_1$, whereby, as will be apparent from the drawings, the pressure within the line $P_1$ may be supplemented, if desired. In this manner, the greatly increased pressure required in "bumping" the pipe ends together may be applied at the proper time during the flash welding cycle, in a manner to be described more fully hereinafter.

A central control station may be provided at a convenient location on the vehicular units for operation of the various hydraulic devices.

*Electrical controls for flash welding system*

A schematic electrical diagram of the flash welding circuit together with a means synchronizing it to the hydraulic system for automatically relating the flash welding operation to the application of the bumping pressure to the pipe by means of the clamps 36 and 37 is shown in Fig. 19. The components of the electrical system are conventional per se and therefore it is believed that a schematic diagram is sufficient for those skilled in the art.

A battery pack is shown at 265 connected through a rheostat 266 to a center contact 267 of a carbon disk type contacter, the outer disks of which are connected to one electrode 268. The circuit is completed through the opposite electrode 268a which is electrically connected to the opposite pole of the battery pack.

The carbon disk contacter has a control element 267a which will be hereinafter more fully described. However, it is sufficient at this point in the specification to state that this control provides a means of controlling the time of application of the welding current by giving a timed closure to the carbon disk contacter and is also connected, through suitable means to be hereinafter described more fully, with the hydraulic system for controlling the application of the bumping pressure to the outer clamps at the termination of the welding operation.

The battery pack 265 is connected through a transformer 269 and automatic charge rate switch 270 to a source of three-phase current through leads 271 controlled by a manual disconnect switch 272. The connection of the battery pack to the source of current includes a rectifier 273 so that only D.-C. current is fed into the battery pack. The leads 271 may be connected to any suitable source of three-phase alternating current, but preferably is connected to the generator 47 driven by diesel engine 45 shown in Fig. 2, and carried on the vehicular support 29 as a part of a portable unit.

The automatic charge rate switch 270 has an operable connection with a suitable voltage regulator or meter 274 which is connected to the battery pack 265. As indicated, the primary coils 269a of the transformer have center taps as well as end taps whereby the turns ratio of the transformer may be varied depending upon the position of the movable contacts 270a of the charge rate switch.

Referring back to the timing mechanism for the control element 267a for the carbon disk contacter, it will be appreciated that the duration of the welding cycle will vary depending upon the diameter of the pipe and the material of the pipe to be welded. Nevertheless, a definite time is involved for each set of circumstances, during which the welding current must be applied to the joint to be welded. The control 267a is arranged to make contact between the carbon disk contacts for this definite time period.

The bumping pressure of substantially tenfold the usual pressure applied to the outer clamps is applied during the last portion of the flash welding operation. For this reason, the hydraulic system includes the valve 268 to the auxiliary pressure line P₂. This valve has an operable connection (not shown) to a solenoid 275 which is connected in an auxiliary circuit with a source of current 276, a manual switch 277 and an automatically controlled switch including a fixed contact 278 and a movable contact 279 with an arcuate contact element. The movable contact 279 is mounted upon a pivoted arm 280, one end of which is connected by a link 281 to the plunger element of the control element 267a. It is believed apparent that as the plunger is depressed to make contact between the carbon disks that the arm 280 will be rocked so that the arcuate contact 279 will pass the rigid contact 278 and be out of engagement therewith. This, of course, also initiates the application of the welding current to the joint to be welded. This plunger is so arranged that during a predetermined portion of the last part of the application of the welding current to the joint the arcuate contact 279 will be brought into engagement with the rigid contact. Of course, immediately upon starting the timing cycle the manual switch 277 will be closed. Thus, when the movable contact 279 is engaged with contact 278, current is applied to the solenoid 275 thereby automatically shifting the valve 258 so as to supply the added pressure through line P₂ to accomplish the bumping operation. However, the contact 279 is moved past the contact 278 at the termination of application of the welding current. Thus, the valve 258 is returned by the spring of the solenoid to its position disconnecting the high pressure source from the cylinders 99.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The apparatus having been described, what is claimed is:

1. Apparatus for use in joining the end of a pipeline with a pipe section, comprising, a vehicular support, a beam for receiving said end of the pipeline and pipe section in end-to-end relation, means pivotally mounting said beam from said support at a point intermediate the ends of the beam to permit said beam to tilt to accommodate the natural curvature of the end of the pipeline when receiving the same, and means on the beam for axially aligning the ends of the pipeline and pipe section in abutting position on said beam.

2. Apparatus for use in joining the end of a pipeline with a pipe section, comprising, a support, a beam pivotally mounted on the support for tilting movement into position to accommodate the natural curvature of said end to the pipeline, means on said beam to hold the end of the pipeline and the pipe section to be joined thereto in axial alignment with one another, and guide means on said beam and spaced from the holding means for supporting the end of the pipeline in a substantially unstressed condition when axially aligned with said pipe section.

3. Apparatus of the character defined in claim 2, including additional guide means on said beam and spaced from the holding means for supporting the pipe section in a substantially unstressed condition when axially aligned with said pipeline.

4. Apparatus for use in joining the end of a pipeline with a pipe section, comprising, a support, a beam pivotally mounted on the support for tilting movement into position to accommodate the natural curvature of said end of the pipeline, guide means on said beam for supporting the end of the pipeline and the pipe section in substantially unstressed condition and in end-to-end and substantially axially aligned relation, and clamping means on said beam for maintaining said pipe section and pipeline in said position, said clamping means also including means preventing rotation of said pipe section and pipeline about their common axis.

5. Apparatus for use in joining the end of a pipeline with a pipe section, comprising, a vehicular support, a beam pivotally mounted on the support for tilting movement into position to accommodate the natural curvature of said end of the pipeline, said beam including at least two sections pivotally connected together, and guide means on each of said beam sections for supporting said pipe section and said end of the pipeline in end-to-end relation.

6. Apparatus for use in joining the end of a pipeline with a pipe section, comprising, a support, a beam pivotally mounted on the support for tilting movement into position to receive said end of the pipeline in substantially unstressed condition, said beam including at least two pivotally connected sections for movement relative to one another into position to receive said pipe section in substantial axial alignment and end-to-end relation with the end of said pipeline, and means on said beam for holding the pipe section and end of the pipeline in said axially aligned and end-to-end relation.

7. Apparatus for use in joining the end of a pipeline with a pipe section, comprising, a support, a beam pivotally mounted on said support for tilting movement into position to receive said end of the pipeline in substantially unstressed condition, guide means on said beam and pivotally connected to opposite ends of said beam for supporting said pipe section and said end of the pipeline in said substantially unstressed condition, and means on said beam for holding said pipe section and said end of the pipeline in axially aligned end-to-end relation.

References Cited in the file of this patent

UNITED STATES PATENTS

| | | |
|---|---|---|
| Re. 20,439 | Rippel | July 6, 1937 |
| 444,855 | Ries | Jan. 20, 1891 |
| 1,339,417 | Pierce | May 11, 1920 |
| 1,642,825 | Pearce | Sept. 20, 1927 |
| 1,683,762 | Ardenne | Sept. 11, 1928 |
| 1,696,455 | Rupley | Dec. 25, 1928 |
| 1,775,311 | Halle | Sept. 9, 1930 |
| 1,832,719 | McBerty | Nov. 17, 1931 |
| 1,913,322 | Adams | July 6, 1933 |
| 1,922,913 | Free | Aug. 15, 1933 |
| 1,962,297 | Candy | June 12, 1934 |
| 1,983,159 | Adams | Dec. 4, 1934 |
| 1,986,740 | Moreira | Jan. 1, 1935 |
| 2,003,320 | Trainer | June 4, 1935 |
| 2,013,630 | Goldsborough | Sept. 3, 1935 |
| 2,403,229 | Murray | July 2, 1946 |
| 2,525,862 | Carpenter | Oct. 17, 1950 |
| 2,535,653 | Schaefer | Dec. 26, 1950 |
| 2,538,365 | Jones | June 16, 1951 |
| 2,573,295 | Allardt | Oct. 30, 1951 |
| 2,611,848 | Smith | Sept. 23, 1952 |
| 2,615,414 | Adams | Oct. 28, 1952 |
| 2,677,746 | Duch | May 4, 1954 |
| 2,735,270 | Collins | Feb. 21, 1956 |

FOREIGN PATENTS

| | | |
|---|---|---|
| 551,181 | Germany | May 28, 1932 |
| 456,326 | Great Britain | Nov. 6, 1936 |